(12) United States Patent
Wang et al.

(10) Patent No.: US 8,283,006 B2
(45) Date of Patent: *Oct. 9, 2012

(54) INJECTION MOLDING MATERIAL CONTAINING STARCH AND PLANT PROTEIN

(75) Inventors: James H. Wang, Appleton, WI (US); Gregory J. Wideman, Menasha, WI (US); Bo Shi, Neenah, WI (US); Sarah A. Funk, Omro, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 856 days.

This patent is subject to a terminal disclaimer.

(21) Appl. No.: 12/337,788

(22) Filed: Dec. 18, 2008

(65) Prior Publication Data

US 2010/0159170 A1 Jun. 24, 2010

(51) Int. Cl.
*B27N 5/02* (2006.01)
*C08L 3/00* (2006.01)

(52) U.S. Cl. ............................... 428/35.6; 524/17

(58) Field of Classification Search ............... 524/17; 428/35.6

See application file for complete search history.

(56) References Cited

U.S. PATENT DOCUMENTS

| | | | |
|---|---|---|---|
| 3,137,592 | A | 6/1964 | Protzman et al. |
| 3,655,129 | A | 4/1972 | Seiner |
| 3,963,656 | A | 6/1976 | Meisert et al. |
| 4,174,330 | A | 11/1979 | Gilbert et al. |
| 4,209,417 | A | 6/1980 | Whyte |
| 4,797,468 | A | 1/1989 | De Vries |
| 5,028,648 | A | 7/1991 | Famili et al. |
| 5,028,658 | A | 7/1991 | David et al. |

(Continued)

FOREIGN PATENT DOCUMENTS

CA 1238738 A 6/1988

(Continued)

OTHER PUBLICATIONS

Benham et al., "Polyethylene, High Density," Kirk-Othmer Encyclopedia of Chemical Technology, p. 8, 2005.*

(Continued)

*Primary Examiner* — Rena Dye
*Assistant Examiner* — Susan R Dye
(74) *Attorney, Agent, or Firm* — Dority & Manning, P.A.

(57) ABSTRACT

An injection molding material that includes a renewable resin containing a combination of renewable polymers (e.g., starch and plant protein) and a plasticizer is provided. Although such compounds are normally difficult to process into thermoplastics, the present inventors have discovered that injection molding materials may nevertheless be formed by melt blending the renewable resin with a synthetic resin (e.g., polyolefin) while selectively controlling the nature of the resins and their relative concentrations. In this manner, a morphology may be achieved in which the renewable resin is present as a discontinuous phase that is dispersed within a continuous phase of the synthetic resin (e.g., "island-in-the-sea" morphology). The discontinuous and continuous phases may each constitute from about 30 vol. % to about 70 vol. %, and in some embodiments, from about 40 vol. % to about 60 vol. %. With such a morphology, the continuity of the synthetic resin can minimize the aggregate properties of the renewable resin such that the molding material possesses melt properties similar to that of the synthetic resin. Further, this morphology may also minimize the need to use different molding tools as the shrinkage properties of the overall composition may be substantially similar to that of the synthetic resin.

22 Claims, 3 Drawing Sheets

U.S. PATENT DOCUMENTS

| | | | |
|---|---|---|---|
| 5,093,422 A | 3/1992 | Himes | |
| 5,102,465 A | 4/1992 | Lamond | |
| 5,169,706 A | 12/1992 | Collier, IV et al. | |
| 5,292,783 A | 3/1994 | Buchanan et al. | |
| 5,382,611 A | 1/1995 | Stepto et al. | |
| 5,397,834 A | 3/1995 | Jane et al. | |
| 5,446,079 A | 8/1995 | Buchanan et al. | |
| 5,470,944 A | 11/1995 | Bonsignore | |
| 5,523,293 A | 6/1996 | Jane et al. | |
| 5,559,171 A | 9/1996 | Buchanan et al. | |
| 5,580,911 A | 12/1996 | Buchanan et al. | |
| 5,599,858 A | 2/1997 | Buchanan et al. | |
| 5,605,961 A | 2/1997 | Lee et al. | |
| 5,641,562 A | 6/1997 | Larson et al. | |
| 5,665,152 A * | 9/1997 | Bassi et al. | 106/145.1 |
| 5,747,648 A | 5/1998 | Bassi et al. | |
| 5,770,682 A | 6/1998 | Ohara et al. | |
| 5,817,721 A | 10/1998 | Warzelhan et al. | |
| 5,821,327 A | 10/1998 | Oota et al. | |
| 5,880,254 A | 3/1999 | Ohara et al. | |
| 5,900,322 A | 5/1999 | Buchanan et al. | |
| 5,910,545 A | 6/1999 | Tsai et al. | |
| 5,922,379 A | 7/1999 | Wang | |
| 5,939,192 A | 8/1999 | Rettenbacher et al. | |
| 5,945,480 A | 8/1999 | Wang et al. | |
| 5,965,708 A | 10/1999 | Bassi et al. | |
| 5,977,312 A | 11/1999 | Bassi et al. | |
| 5,981,012 A | 11/1999 | Pomplun et al. | |
| 5,985,396 A | 11/1999 | Kerins et al. | |
| 6,008,276 A | 12/1999 | Kalbe et al. | |
| 6,020,425 A | 2/2000 | Wang et al. | |
| 6,063,866 A | 5/2000 | Wang et al. | |
| 6,075,118 A | 6/2000 | Wang et al. | |
| 6,096,809 A | 8/2000 | Lorcks et al. | |
| 6,135,987 A | 10/2000 | Tsai et al. | |
| 6,225,388 B1 | 5/2001 | Tsai et al. | |
| 6,231,970 B1 | 5/2001 | Andersen et al. | |
| 6,235,816 B1 | 5/2001 | Lorcks et al. | |
| 6,258,924 B1 | 7/2001 | Warzelhan et al. | |
| 6,296,914 B1 | 10/2001 | Kerins et al. | |
| 6,297,347 B1 | 10/2001 | Warzelhan et al. | |
| 6,326,458 B1 | 12/2001 | Gruber et al. | |
| 6,350,518 B1 | 2/2002 | Schertz et al. | |
| 6,369,215 B1 | 4/2002 | Peltonen et al. | |
| 6,414,108 B1 | 7/2002 | Warzelhan et al. | |
| 6,417,312 B1 | 7/2002 | Kirchmeyer et al. | |
| 6,469,099 B1 | 10/2002 | Farah et al. | |
| 6,517,625 B2 | 2/2003 | Bassi et al. | |
| 6,530,910 B1 | 3/2003 | Pomplun et al. | |
| 6,544,455 B1 | 4/2003 | Tsai et al. | |
| 6,552,124 B2 | 4/2003 | Wang et al. | |
| 6,552,162 B1 | 4/2003 | Wang et al. | |
| 6,565,640 B1 | 5/2003 | Bengs et al. | |
| 6,605,367 B2 | 8/2003 | Bassi et al. | |
| 6,605,657 B1 | 8/2003 | Favis et al. | |
| 6,660,211 B2 | 12/2003 | Topolkaraev et al. | |
| 6,676,984 B1 | 1/2004 | Sharp et al. | |
| 6,703,115 B2 | 3/2004 | Hale et al. | |
| 6,709,671 B2 | 3/2004 | Zerbe et al. | |
| 6,713,595 B2 | 3/2004 | Chung et al. | |
| 6,746,705 B2 | 6/2004 | Altieri et al. | |
| 6,749,795 B2 | 6/2004 | Murphy | |
| 6,767,961 B1 | 7/2004 | Wang et al. | |
| 6,806,353 B2 | 10/2004 | Zhang et al. | |
| 6,838,403 B2 | 1/2005 | Tsai et al. | |
| 6,890,989 B2 | 5/2005 | Wang et al. | |
| 6,905,759 B2 | 6/2005 | Topolkaraev et al. | |
| 6,921,581 B2 | 7/2005 | Van Gelder et al. | |
| 6,933,335 B1 | 8/2005 | Berger et al. | |
| 6,946,506 B2 | 9/2005 | Bond et al. | |
| 6,958,371 B1 | 10/2005 | Wang et al. | |
| 6,984,426 B2 | 1/2006 | Miksic et al. | |
| 6,987,138 B2 | 1/2006 | Tokiwa et al. | |
| 7,045,650 B2 | 5/2006 | Lawrey et al. | |
| 7,053,151 B2 | 5/2006 | Wang et al. | |
| 7,077,994 B2 | 7/2006 | Bond et al. | |
| 7,098,292 B2 | 8/2006 | Zhao et al. | |
| 7,124,450 B2 | 10/2006 | Davidson | |
| 7,153,354 B2 | 12/2006 | Narayan et al. | |
| 7,153,569 B2 | 12/2006 | Kaufman et al. | |
| 7,235,594 B2 | 6/2007 | Han et al. | |
| 7,297,394 B2 | 11/2007 | Khemani et al. | |
| 7,307,125 B2 | 12/2007 | Chundury et al. | |
| 7,368,160 B2 | 5/2008 | Inglis | |
| 7,402,618 B2 | 7/2008 | Xu | |
| 7,413,731 B2 | 8/2008 | Heltovics et al. | |
| 2002/0098341 A1 | 7/2002 | Schiffer et al. | |
| 2003/0077395 A1 | 4/2003 | Bassi et al. | |
| 2003/0099692 A1 | 5/2003 | Lydzinski et al. | |
| 2003/0232933 A1 | 12/2003 | Lagneaux et al. | |
| 2004/0034149 A1 | 2/2004 | Garcia | |
| 2004/0108611 A1 | 6/2004 | Dennis et al. | |
| 2005/0186256 A1 | 8/2005 | Dihel et al. | |
| 2005/0208294 A1 | 9/2005 | Kaufman et al. | |
| 2005/0244606 A1 | 11/2005 | Egawa | |
| 2006/0135728 A1 | 6/2006 | Peerlings et al. | |
| 2006/0149199 A1 | 7/2006 | Topolkaraev et al. | |
| 2007/0031555 A1 | 2/2007 | Axelrod et al. | |
| 2007/0049685 A1 | 3/2007 | Hansel et al. | |
| 2007/0049719 A1 | 3/2007 | Brauer et al. | |
| 2007/0129467 A1 | 6/2007 | Scheer | |
| 2007/0246867 A1 | 10/2007 | Nelson et al. | |
| 2007/0298237 A1 | 12/2007 | Goino et al. | |
| 2008/0147034 A1 | 6/2008 | Wang et al. | |
| 2009/0054548 A1 | 2/2009 | Wang et al. | |

FOREIGN PATENT DOCUMENTS

| | | | |
|---|---|---|---|
| EP | 327505 A2 * | 8/1989 | |
| EP | 0565386 A1 | 10/1993 | |
| EP | 1235879 B1 | 5/2004 | |
| EP | 1075188 B1 | 11/2005 | |
| WO | WO 9719988 A1 | 6/1997 | |
| WO | WO 0136535 A1 | 5/2001 | |
| WO | WO 02053376 A2 | 7/2002 | |
| WO | WO 02053376 A3 | 7/2002 | |
| WO | WO 2005113616 A2 | 12/2005 | |
| WO | WO 2005113616 A3 | 12/2005 | |

OTHER PUBLICATIONS

Middleman, Fundamentals of Polymer Processing, p. 260, 1977.*

Abstract of Japanese Patent No. JP2006137847 dated Jun. 1, 2006, 1 page.

Abstract of Japanese Patent No. JP2006505719 dated Feb. 16, 2006, 1 page.

ASTM D 1238-04c—*Standard Test Method for Melt Flow Rates of Thermoplastics by Extrusion Plastometer*, Current edition approved Dec. 1, 2004, Originally approved in 1965, pp. 1-14.

ASTM D 1343-56—*Standard Method of Test for Viscosity of Cellulose Derivatives by Ball-Drop Method*, Adopted 1956, pp. 486-489.

ASTM D 1505-03—*Standard Test Method for Density of Plastics by the Density-Gradient Technique*, Current edition approved Nov. 1, 2003, Originally approved in 1957, pp. 1-7.

ASTM D 1525-07—*Standard Test Method for Vicat Softening Temperature of Plastics*, Current edition approved Mar. 1, 2007, Originally approved in 1958, pp. 1-9.

ASTM D 3418-03 (D 3417-99)—*Standard Test Method for Transition Temperatures and Enthalpies of Fusion and Crystallization of Polymers by Differential Scanning Calorimetry*, Current edition approved Dec. 1, 2003, Originally approved in 1976, pp. 66-72.

ASTM D 3806-98 (Reapproved 2004)—*Standard Test Method of Small-Scale Evaluation of Fire-Retardant Paints (2-Foot Tunnel Method)*, Current edition approved Jun. 1, 2004, Originally approved in 1979, pp. 1-6.

ASTM D 5034-95—*Standard Test Method for Breaking Strength and Elongation of Textile Fabrics (Grab Test)*, Current edition approved May 15, 1995, pp. 674-681.

ASTM D 5338-92—*Standard Test Method for Determining Aerobic Biodegradation of Plastic Materials Under Controlled Composting Conditions*, Current edition approved Dec. 15, 1992, pp. 456-461.

ASTM D 638-08—*Standard Test Method for Tensile Properties of Plastics*, Current edition approved Apr. 1, 2008, Originally approved in 1941, pp. 1-16.

ASTM D 790-99—*Standard Test Methods for Flexural Properties of Unreinforced and Reinforced Plastics and Electrical Insulating Materials*, Current edition approved Nov. 10, 1999, pp. 150-158.

Article—*Aging Properties of Films of Plasticized Vital Wheat Gluten Cast from Acidic and Basic Solutions*, Olabarrieta et al., Biomacromolecules, vol. 7, No. 5, 2006, pp. 1657-1664.

Article—*Biodegradable Compositions by Reactive Processing of Aliphatic Polyester/Polysaccharide Blends*, Dubois et al., Macromol. Symp., vol. 198, 2003, pp. 233-243.

Article—*Biodegradable Soy Protein-Polyester Blends by Reactive Extrusion Process*, Graiver et al., Journal of Applied Polymer Science, vol. 92, 2004, pp. 3231-3239.

Article—*Chemical Modification of Starch*, Tomasik et al., Advances in Carbohydrate Chemistry and Biochemistry, vol. 59, 2004, pp. 175-316.

Article—*Edible Protein Films and Coatings*, Food Proteins and Their Applications edited by S. Damodaran and A. Paraf, John M. Krochta, 1997, pp. 529-539.

Article—*Effects of Extruder Die Nozzle Dimensions on Expansion and Micrographic Characterization During Extrusion of Acetylated Starch*, Ganjyal et al., Starch/Stärke, vol. 56, 2004, pp. 108-117.

Article—*Extrusion of Wheat Gluten Plasticized with Glycerol: Influence of Process Conditions on Flow Behavior, Rheological Properties and Molecular Size Distribution*, Redl et al., Cereal Chemistry, vol. 76, No. 3, 1999, pp. 361-370.

Article—*Glycol Glucosides from Starch by Continuous Twin-Screw Extruder Processing*, Carr et al., Cereal Chemistry, vol. 66, No. 3, 1989, pp. 238-243.

Article—*Heat and shear mediated polymerization of plasticized wheat gluten protein upon mixing*, Redl et al., Journal of Cereal Science 38, 2003, pp. 105-114.

Article—*Polyurethane/Polyolefin Blends: Morphology, Compatibilization and Mechanical Properties*, Wang et al., Polymers & Polymer Composites, vol. 14, No. 1, 2006, 11 pages.

Article—*Preparation of Acetylated Distarch Adipates by Extrusion*, Mail et al., Lebensmittel-Wissenschaft und-Technologie, vol. 34, No. 6, 2001, pp. 384-389.

Article—*Reactivity of Wheat Gluten Protein during Mechanical Mixing: Radical and Nucleophilic Reactions for the Addition of Molecules on Sulfur*, Auvergne et al., Biomacromolecules, vol. 9, No. 2, 2008, pp. 664-671.

Article—*Soy Protein-Based Biodegradable Plastics*, Mungara et al., Proceedings in Plastics Impact on the Environment Conference, Society of Plastic, Feb. 2003, pp. 393-397.

Article—*Starch Modification, Destruction and Hydrolysis during O-Formylation*, Divers et al., Starch/Stärke 56, 2004, pp. 389-398.

Article—*The chemical modification of a range of starches under aqueous reaction conditions*, Fang et al., Carbohydrate Polymers 55, 2004, pp. 283-289.

Article—*The History of Tomorrow's Materials: Protein-Based Biopolymers*, Ralston et al., Plastics Engineering, Feb. 2008, pp. 36-40.

Article—*The Hydroxypropylation of Starch in a Self-Wiping Twin Screw Extruder*, De Graaf et al., Advances in Polymer Technology, vol. 22, No. 1, 2003, pp. 56-68.

Article—*Thermoplastic Processing of Protein-Based Bioplastics: Chemical Engineering Aspects of Mixing, Extrusion and Hot Molding*, Pommet et al., Macromol. Symp., vol. 197, 2003, pp. 207-217.

Article—*Thermoplastic Processing of Proteins for Film Formation—A Review*, Hernandez-Izquierdo et al., Journal of Food Science, vol. 73, No. 2, 2008, pp. R30-R39.

Related U.S. Patent Applications.

Abstract for Japanese Patent No. JP2001517253 dated Oct. 2, 2001.

Article—*Polymer blends and composites from renewable resources*, Yu et al., Prog. Polym. Sci., vol. 31, 2006, pp. 576-602.

Search Report and Written Opinion for PCT/IB2009/054733 dated Jul. 13, 2010, 11 pages.

\* cited by examiner

INJECTION MOLDING MATERIAL CONTAINING STARCH AND PLANT PROTEIN

BACKGROUND OF THE INVENTION

Injection molding is commonly used to form plastic articles that are relatively rigid in nature, including containers, medical devices, and so forth. For example, containers for stacks or rolls of pre-moistened wipes are generally formed by injection molding techniques. One problem associated with such containers, however, is that the molding material is often formed from a synthetic polymer (e.g., polypropylene or HDPE) that is not renewable (e.g., directly obtained or derived from a plant) or biodegradable. The use of biodegradable and renewable polymers in the injection molding material is likewise problematic due to the difficulty involved with thermally processing such polymers. Further, when attempting to use biodegradable polymers, it is also generally necessary to use a different molding tool due to the differences in shrinkage properties between such polymers and conventional synthetic polymers. Unfortunately, the need to change molding tools increases the time and costs involved with the molding operation.

As such, a need currently exists for an injection molding material that contains a biodegradable and renewable component.

SUMMARY OF THE INVENTION

In accordance with one embodiment of the present invention, an injection molding material is disclosed that comprises from about 5 wt. % to about 60 wt. % of a renewable resin and from about 40 wt. % to about 95 wt. % of a synthetic resin. The renewable resin contains a starch component in an amount from about 25 wt. % to about 85 wt. %, a plant protein component in an amount from about 5 wt. % to about 50 wt. %, and a plasticizer component in an amount from about 5 wt. % to about 50 wt. %, based on the weight of the renewable resin.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
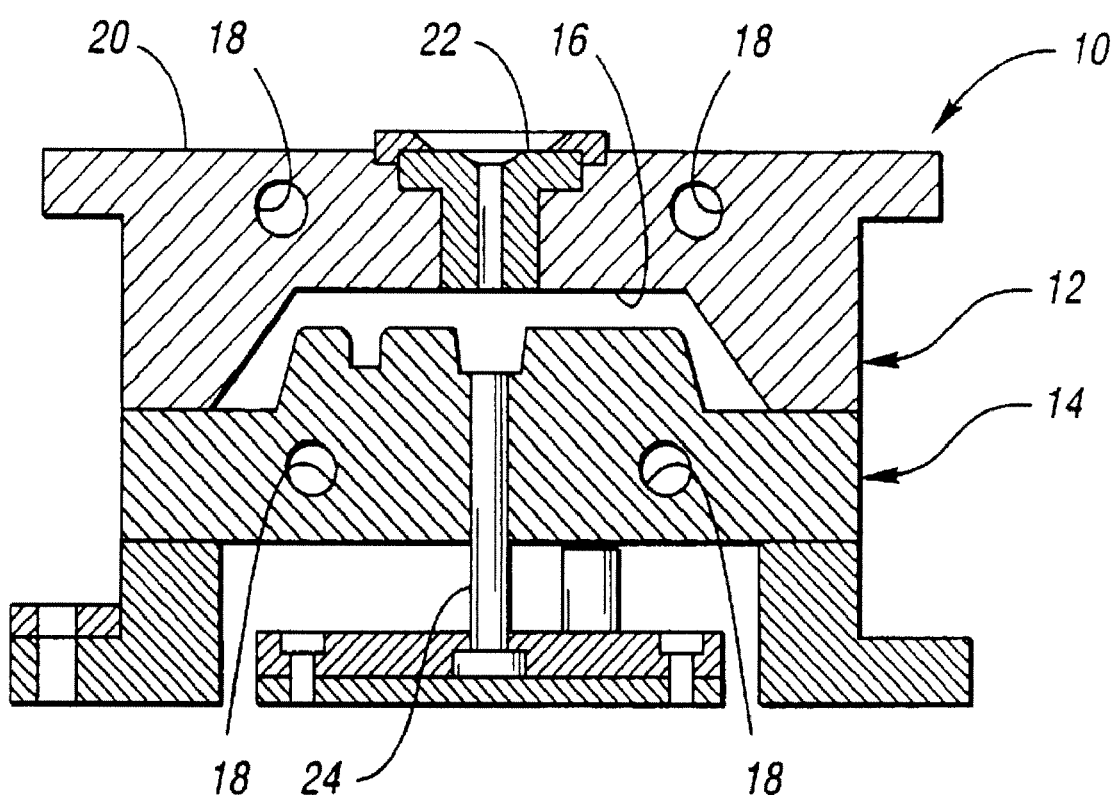
FIG. 1 is a schematic illustration of one embodiment of an injection molding apparatus for use in the present invention.

Repeat use of references characters in the present specification and drawing is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to an injection molding material that includes a renewable resin containing a combination of renewable polymers (e.g., starch and plant protein) and a plasticizer. Although such compounds are normally difficult to process into thermoplastics, the present inventors have discovered that injection molding materials may nevertheless be formed by melt blending the renewable resin with a synthetic resin (e.g., polyolefin) while selectively controlling the nature of the resins and their relative concentrations. In this manner, a morphology may be achieved in which the renewable resin is present as a discontinuous phase that is dispersed within a continuous phase of the synthetic resin (e.g., "island-in-the-sea" morphology). The discontinuous and continuous phases may each constitute from about 30 vol. % to about 70 vol. %, and in some embodiments, from about 40 vol. % to about 60 vol. %. With such a morphology, the continuity of the synthetic resin can minimize the aggregate properties of the renewable resin such that the molding material possesses melt properties similar to that of the synthetic resin. Further, this morphology may also minimize the need to use different molding tools as the shrinkage properties of the overall composition may be substantially similar to that of the synthetic resin.

To help achieve the desired phase distribution, the molding material typically contains from about 40 wt. % to about 95 wt. %, in some embodiments from about 50 wt. % to about 90 wt. %, and in some embodiments, from about 60 wt. % to about 85 wt. % of synthetic resin(s) and from about 5 wt. % to about 60 wt. %, in some embodiments from about 10 wt. % to about 50 wt. %, and in some embodiments, from about 15 wt. % to about 40 wt. % of renewable resin(s). Further, the renewable resin typically contains a starch component in an amount from about 25 wt. % to about 85 wt. %, in some embodiments, from about 30 wt. % to about 80 wt. %, and in some embodiments, from about 40 wt. % to about 70 wt. % and a plant protein component in an amount from about 5 wt. % to about 50 wt. %, in some embodiments, from about 10 wt. % to about 40 wt. %, and in some embodiments, from about 15 wt. % to about 35 wt. %.

Various embodiments of the present invention will now be described in more detail below.

I. Molding Material
  A. Renewable Resin
   i. Starch Component

Starch is a natural polymer composed of amylose and amylopectin. Amylose is essentially a linear polymer having a molecular weight in the range of 100,000-500,000, whereas amylopectin is a highly branched polymer having a molecular weight of up to several million. Although starch is produced in many plants, typical sources include seeds of cereal grains, such as corn, waxy corn, wheat, sorghum, rice, and waxy rice; tubers, such as potatoes; roots, such as tapioca (i.e., cassava and manioc), sweet potato, and arrowroot; and the pith of the sago palm. To facilitate the formation of molding materials in accordance with the present invention, the starch may be chemically modified by processes known in the art (e.g., esterification, etherification, oxidation, acid hydrolysis, enzymatic hydrolysis, etc.). Starch ethers and/or esters may be particularly desirable, such as hydroxyalkyl starches, carboxymethyl starches, etc. The hydroxyalkyl group of hydroxylalkyl starches may contain, for instance, 2 to 10 carbon atoms, in some embodiments from 2 to 6 carbon atoms, and in some embodiments, from 2 to 4 carbon atoms. Representative hydroxyalkyl starches such as hydroxyethyl starch, hydroxypropyl starch, hydroxybutyl starch, and derivatives thereof. Starch esters, for instance, may be prepared using a wide variety of anhydrides (e.g., acetic, propionic, butyric, and so forth), organic acids, acid chlorides, or other esterification reagents. Examples of such starch esters may include starch acetate, starch butyrate, starch alkanoate, etc. The degree of esterification may vary as desired, such as from 1 to 3 ester groups per glucosidic unit of the starch.

The starch may contain different weight percentages of amylose and amylopectin, different polymer molecular weights, etc. High amylose starches contain greater than about 50% by weight amylose and low amylose starches contain less than about 50% by weight amylose. Although not required, low amylose starches having an amylose content of from about 10% to about 40% by weight, and in some embodiments, from about 15% to about 35% by weight, are particularly suitable for use in the present invention. Examples of such low amylose starches include corn starch and potato starch, both of which have an amylose content of approximately 20% by weight. Such low amylose starches typically have a number average molecular weight ("$M_n$") ranging from about 50,000 to about 1,000,000 grams per mole, in some embodiments from about 75,000 to about 800,000 grams per mole, and in some embodiments, from about 100,000 to about 600,000 grams per mole, as well as a weight average molecular weight ("$M_w$") ranging from about 5,000,000 to about 25,000,000 grams per mole, in some embodiments from about 5,500,000 to about 15,000,000 grams per mole, and in some embodiments, from about 6,000,000 to about 12,000,000 grams per mole. The ratio of the weight average molecular weight to the number average molecular weight ("$M_w/M_n$"), i.e., the "polydispersity index", is also relatively high. For example, the polydispersity index may range from about 20 to about 100. The weight and number average molecular weights may be determined by methods known to those skilled in the art.

ii. Plant Protein Component

The protein may be any known in the art and be available as part of a larger formulation, such as an isolate with carbohydrates and fiber. Plant proteins may include, for instance, water-insoluble fractions from zein, corn gluten, wheat gluten, canola, sunflower, sorghum, and soybean. Any form of protein may be used, such as isolates, concentrates and flour. For example, soy proteins may be in the form of an isolate containing from about 75 wt. % to about 98 wt. % protein, a concentrate containing from about 50 wt. % to about 75 wt. % protein, or flour containing from about 30 wt. % to about 50 wt. % protein. In certain embodiments, it is desirable to use a protein that is relatively pure, such as those having a protein content of about 75 wt. % or more, and in some cases, about 85 wt. % or more. Gluten proteins, for instance, may be purified by washing away any associated starch to leave a composite of gliadin and glutenin proteins. Examples of such proteins are available from Archer Daniels Midland ("ADM") of Decatur, Ill. Similarly, purified soy protein isolates may be prepared by alkaline extraction of a defatted meal and acid precipitation, a technique well-known and used routinely in the art. Such purified soy proteins are commercially available as Promine R (Central Soya), which is a soy protein isolate having a protein content of approximately 95 wt. %. Other purified soy protein products are also available from DuPont of Louisville, Ky. under the designation PRO-Cote®.

iii. Plasticizer Component

In addition to starch(es) and plant protein(s), one or more plasticizers are also employed in the renewable resin to help render the starch and/or plant protein melt-processable. Starches, for instance, normally exist in the form of granules that have a coating or outer membrane that encapsulates the more water-soluble amylose and amylopectin chains within the interior of the granule. When heated, plasticizers may soften and penetrate the outer membrane and cause the inner starch chains to absorb water and swell. This swelling will, at some point, cause the outer shell to rupture and result in an irreversible destructurization of the starch granule. Once destructurized, the starch polymer chains containing amylose and amylopectin polymers, which are initially compressed within the granules, will stretch out and form a generally disordered intermingling of polymer chains. Upon resolidification, however, the chains may reorient themselves to form crystalline or amorphous solids having varying strengths depending on the orientation of the starch polymer chains.

Suitable plasticizers may include, for instance, polyhydric alcohol plasticizers, such as sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), polyols (e.g., ethylene glycol, glycerol, propylene glycol, dipropylene glycol, butylene glycol, and hexane triol), etc. Also suitable are hydrogen bond forming organic compounds which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof. Other suitable plasticizers may include phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic acids may also be used, such as copolymers of ethylene and acrylic acid, polyethylene grafted with maleic acid, polybutadiene-co-acrylic acid, polybutadiene-co-maleic acid, polypropylene-co-acrylic acid, polypropylene-co-maleic acid, and other hydrocarbon based acids. A low molecular weight plasticizer is preferred, such as less than about 20,000 g/mol, preferably less than about 5,000 g/mol and more preferably less than about 1,000 g/mol.

Generally speaking, plasticizer(s) constitutes from about 5 wt. % to about 50 wt. %, in some embodiments, from about 10 wt. % to about 40 wt. %, and in some embodiments, from about 15 wt. % to about 35 wt. % of the renewable resin.

B. Synthetic Resin

Any of a variety of synthetic resins commonly used in molding materials may be employed in the present invention. Examples of such resins may include, for instance, polyolefins, styrenic polymers (e.g., acrylonitrile butadiene styrene), polycarbonates, acetal polymers, polyamides, vinyl chloride polymers, polyesters (e.g., PET, PBT, etc.), and so forth. Polyolefins are particularly suitable for use in the present invention. Suitable polyolefins may include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth. If desired, the polyolefin may be a copolymer of ethylene or propylene and a higher alpha olefin comonomer (e.g., $C_2$-$C_{12}$ monomers), such ethylene, propylene, 1-butene, 4-methyl-pentene, 1-hexene, 1-octene and higher olefins as well as copolymers and terpolymers of the foregoing. In one particular embodiment, a polypropylene is employed that is a copolymer of propylene and an α-olefin, such as ethylene. The propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %. The density of the polyolefin may vary depending on the type of polymer employed, but generally ranges from 0.88 to 0.98 grams per cubic centimeter ("g/cm$^3$"), in some embodiments from about 0.91 to 0.97 g/cm$^3$, in some embodiments from 0.93 to 0.97 g/cm$^3$, and in some embodiments, from 0.94 to 0.96 g/cm$^3$. HDPE, for instance, typically has a density in the range of from 0.94 to 0.96 g/cm$^3$. Densities may be measured in accordance with ASTM 1505.

Any of a variety of known techniques may generally be employed to form the polyolefins. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes.

Regardless of the polymer chosen, the melt flow index (MI) of the synthetic resin is typically in the range of about 5 grams per 10 minutes to about 100 grams per 10 minutes, in some embodiments from about 10 grams per 10 minutes to about 80 grams per 10 minutes, and in some embodiments, about 15 to about 10 grams per 50 minutes, determined at a temperature of 190° C. The melt flow index is the weight of the polymer (in grams) that may be forced through an extrusion rheometer orifice (0.0825-inch diameter) when subjected to a force of 2.16 kilograms in 10 minutes at 190° C., and may be determined in accordance with ASTM Test Method D1238-E.

C. Other Components

In addition to the components noted above, other ingredients may also be employed in the present invention, such as melt stabilizers, processing stabilizers, heat stabilizers, light stabilizers, antioxidants, heat aging stabilizers, whitening agents, antiblocking agents, bonding agents, etc. Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of molded articles. Some suitable hindered phenols include those available from Ciba Specialty Chemicals under the trade name "Irganox®", such as Irganox® 1076, 1010, or E 201. When employed, ingredients (e.g., lubricant, antioxidant, stabilizer, etc.) may each be present in an amount of from about 0.001 wt. % to about 1 wt. %, in some embodiments, from about 0.005 wt. % to about 1 wt. %, and in some embodiments, from 0.01 wt. % to about 0.5 wt. % of the molding material.

II. Injection Molding

Any suitable injection molding equipment may generally be employed in the present invention. Referring to FIG. 1, for example, one embodiment of an injection molding apparatus or tool 10 that may be employed in the present invention is shown. In this embodiment, the apparatus 10 includes a first mold base 12 and a second mold base 14, which together define an article or component-defining mold cavity 16. Each of the mold bases 12 and 14 includes one or more cooling lines 18 through which a cooling liquid such as water flows to cool the apparatus 10 during use. The molding apparatus 10 also includes a resin flow path that extends from an outer exterior surface 20 of the first mold half 12 through a sprue 22 to the article-defining mold cavity 16. The resin flow path may also include a runner and a gate, both of which are not shown for purposes of simplicity. The molding apparatus 10 also includes one or more ejector pins 24 slidably secured within the second mold half 14 that helps to define the article-defining cavity 16 in the closed position of the apparatus 10, as indicated in FIG. 1. The ejector pin 24 operates in a well known fashion to remove a molded article or component from the article-defining cavity 16 in the open position of the molding apparatus 10.

The renewable resin and the synthetic resin, as well as their components, may be blended together before and/or after being supplied to the molding apparatus 10. In one particular embodiment, the raw materials (e.g., starch, plant protein, plasticizer, etc.) are initially supplied to a melt blending device within which they are dispersively blended. For example, an extruder may be employed that includes feeding and venting ports. In one embodiment, the starch and plant protein may be fed to a feeding port of the twin-screw extruder and melted. Thereafter, the plasticizer may be fed into the polymer melt. The synthetic resin may also be supplied to the melt blending device at this stage, or it may be subsequently melt blended with the renewable resin in a separate melt blending device. Regardless, the renewable and synthetic resins are melt blended under heat and shear/pressure to ensure sufficient mixing and formation of the desired continuous and discontinuous phases. For example, melt blending may occur at a temperature of from about 70° C. to about 200° C., in some embodiments, from about 80° C. to about 180° C., and in some embodiments, from about 90° C. to about 160° C. Likewise, the apparent shear rate during melt blending may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Referring again to FIG. 1, the resulting melt blended material may be directly injected into the molding apparatus 10 using techniques known in the art. For example, the molding material may be supplied in the form of pellets to a feed hopper attached to a barrel that contains a rotating screw (not shown). As the screw rotates, the pellets are moved forward and undergo extreme pressure and friction, which generates heat to melt the pellets. Electric heater bands (not shown) attached to the outside of the barrel may also assist in the heating and temperature control during the melting process. For example, the bands may be heated to a temperature of from about 100° C. to about 250° C., in some embodiments from about 110° C. to about 225° C., and in some embodiments, from about 120° C. to about 200° C. Upon entering the molding cavity 16, the molding material is solidified by the cooling liquid flowing through the lines 18. The cooling liquid may, for example, be at a temperature (the "molding temperature") of from about 5° C. to about 50° C., in some embodiments from about 10° C. to about 40° C., and in some embodiments, from about 15° C. to about 30° C.

III. Articles

The molding material of the present invention may be used to form articles having a wide variety of shapes, sizes, and configurations. For instance, the article may be a medical device, such as surgical instruments (e.g., scalpels, scissors, retractors, suction tubes, probes, etc.); implants (e.g., bone plates, prosthetics, plates, screws, etc.); and so forth. Besides medical devices, the molding material may also be used to form various articles used in "personal care" applications. For instance, in one particular embodiment, the molding material is used to form a wet wipe container. The configuration of the container may vary as is known in the art, such as described in U.S. Pat. No. 5,687,875 to Watts, et al.; U.S. Pat. No. 6,568,625 to Faulks, et al.; U.S. Pat. No. 6,158,614 to Haines, et al.; U.S. Pat. No. 3,973,695 to Ames; U.S. Pat. No. 6,523,690 to Buck, et al.; and U.S. Pat. No. 6,766,919 to Huang, et al., which are incorporated herein in their entirety by reference thereto for all purposes.

Figure 4:
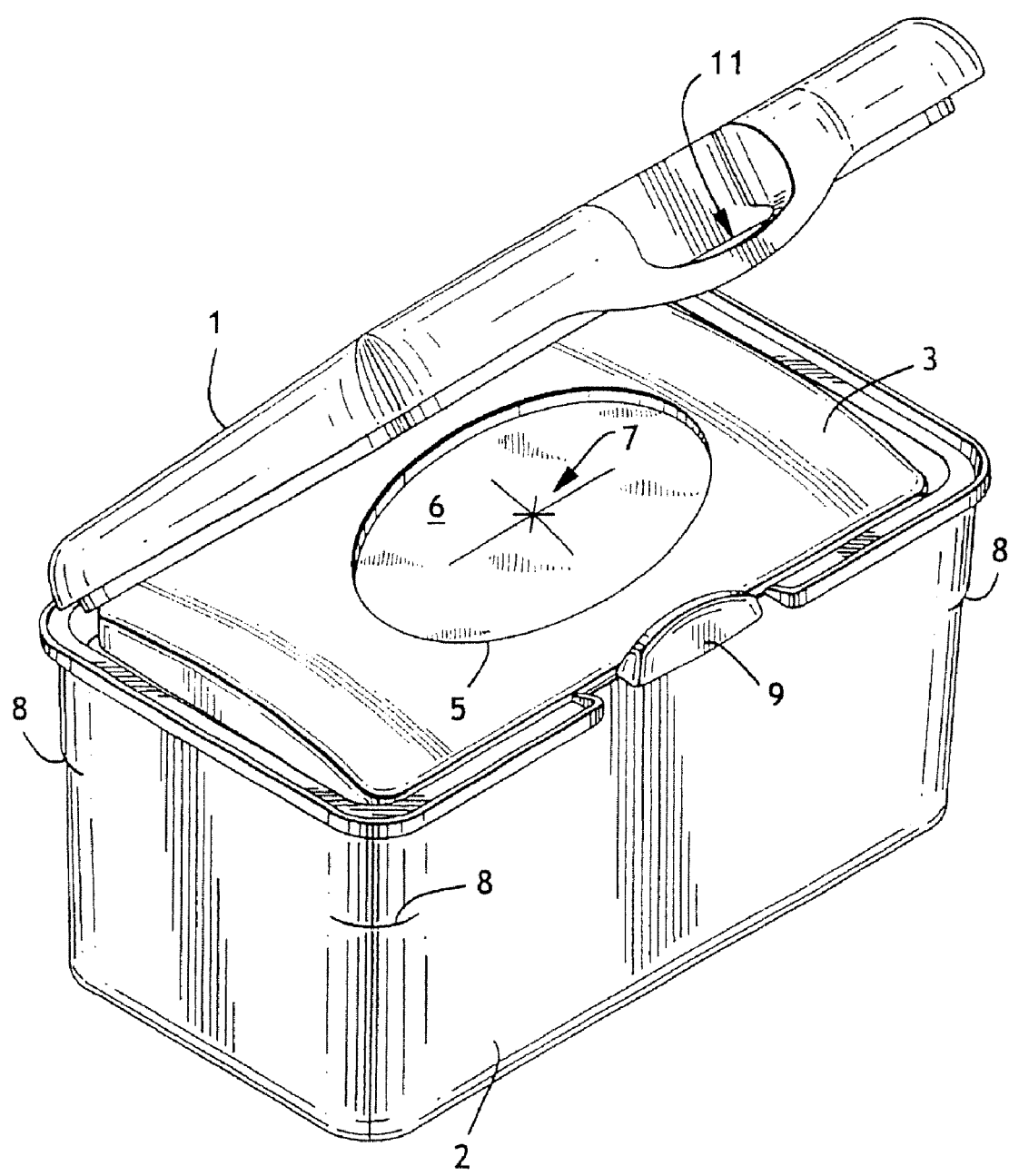
FIG. 4 is a perspective view of one embodiment of a wet wipe dispenser that may be formed from the injection molding material of the present invention.

Referring to FIG. 4, for example, one embodiment of a wet wipe container that may be formed from the molding material of the present invention is shown. As indicated, the container has a lid 1 hingedly attached to a base 2 and a removable inner cover 3. In this particular embodiment, the removable inner cover 3 contains a pop-up style dispensing mechanism that includes a rigid port 5 surrounding a flexible, rubber-like material or sheet 6 having several slits 7 through which individual wet wipes may be pulled. The removable inner cover 3 is removably secured to the sidewalls of the base 2 by a small lip around the periphery of the cover that engages with notches within several protruding ribs on the inner surface of the sidewalls (not shown). The cover 3 also rests on a small support surface in each of the four corners of the base, which is outwardly visible by discontinuities 8 in the rounded corners of the base 2. The lid 1 is secured in a closed position by a suitable latching mechanism, in which a protrusion 9 in the front lip of the base is engaged by an opening 11 in the front lip of the lid. The container shown in FIG. 4 is generally "rigid" in the sense that the material used to form the container typically have a high flexural modulus (as measured in accordance with ASTM D790 "Standard Test Method for Flexural Properties of Unreinforced and Reinforced Plastics and Electrical Insulating Materials"), such as about 500 Newtons per square millimeter or greater, and in some embodiments, from about 1100 to about 1550 Newtons per square millimeter.

Wipes for use with the container, e.g., wet wipes, may be arranged in any manner that provides convenient and reliable dispensing and that assists the wet wipes in not becoming overly dry. For example, the wet wipes may be arranged in the container as a plurality of individual wipes in a stacked configuration to provide a stack of wet wipes that may or may not be individually folded. The wet wipes can be individual wet wipes which are folded in a c-fold configuration, z-fold configuration, connected to adjacent wipes by a weakened line or other non-interfolded configurations as are known to those skilled in the art. Alternatively, the individual wet wipes can be interfolded such that the leading and trailing end edges of successive wipes in the stacked configuration overlap. In each of these non-interfolded and interfolded configurations, the leading end edge of the following wet wipe is loosened from the stack by the trailing end edge of the leading wet wipe as the leading wet wipe is removed by the user from the dispenser or package. For example, representative wet wipes for use with the invention are described in U.S. Pat. No. 6,585,131 to Huang, et al. and U.S. Pat. No. 6,905,748 to Sosalla, which are incorporated herein in their entirety by reference thereto for all purposes.

The present invention may be better understood with reference to the following examples.

Test Methods

Apparent Melt Viscosity:

The Theological properties of polymer samples were determined using a Gottfert Rheograph 2003 capillary rheometer with WinRHEO version 2.31 analysis software. The setup included a 2000-bar pressure transducer and a 30/1:0/180 roundhole capillary die. Sample loading was done by alternating between sample addition and packing with a ramrod. A 2-minute melt time preceded each test to allow the polymer to completely melt at a test temperature (135° C.). The capillary rheometer determined the apparent melt viscosity (Pa·s) at various shear rates, such as 100, 200, 500, 1000, 2000, and 4000 s$^{-1}$. The resultant rheology curve of apparent shear rate versus apparent melt viscosity gave an indication of how the polymer would run at that temperature in an extrusion process.

Example 1

100 wt. % Pro-Cote® 4200 (DuPont) was initially added to a K-Tron feeder (K-Tron America, Pitman, N.J.) that fed the materials into a ZSK-30 co-rotating, twin screw extruder (Werner and Pfleidere Corporation, Ramsey, N.J.). Pro-Cote® 4200 is a soy protein having a weight average molecular weight of about 150,000 to 200,000 Daltons. The extruder diameter was 30 mm and the length of the screws was up to 1328 mm. The extruder has 14 barrels, numbered consecutively 1 to 14 from the feed hopper to the die. The first barrel received the soy protein at a feed rate of 10 lbs/hr. The temperature profile of zones 1 to 14 of the extruder was 100-130° C. for each zone. The screw speed was set at 110 rpm to achieve a torque of 40%. The melt temperature was 123° C. Glycerin was pumped into barrel 5 with a pressurized injector connected with an Eldex pump (Napa, Calif.) at a rate of 24 grams per minute to achieve a 30 wt. % concentration. The vent was opened at the end of the extruder to release moisture. A die was employed to form strands that had 2 openings of 7 mm in diameter, which were separated by 13 mm. The strands were brown in color, uneven, and appeared to have some unconverted material.

Example 2

A mixture of 80 wt. % Glucosol™ 800 (Chemstar, Minneapolis, Minn.) and 20 wt. % Pro-Cote® 4200 (DuPont) was initially formed in a Hobart mixer. Glucosol™ 800 is a modified starch having a weight average molecular weight (determined by GPC) of 2,900,000; polydispersity index of about 28; bulk density of 30~40 lbs/ft$^3$, and D$_{98}$ particle size of 140 mesh. The mixture was then added to a K-Tron feeder (K-Tron America, Pitman, N.J.) that fed the materials into a ZSK-30 co-rotating, twin screw extruder (Werner and Pfleidere Corporation, Ramsey, N.J.) as described in Example 1. The first barrel received the mixture at a feed rate of 10 lbs/hr. The temperature profile of zones 1 to 14 of the extruder was 90° C., 110° C., 125° C., 130° C., 130° C., 122° C., and 117° C. The screw speed was set at 150 rpm to achieve a torque of about 60%. The melt temperature was 128° C. to 130° C. Glycerin was pumped into barrel 5 with a pressurized injector connected with an Eldex pump (Napa, Calif.) at a rate of 24 grams per minute to achieve a 30 wt. % concentration. The vent was opened at the end of the extruder to release moisture. A die was employed to form strands that had 2 openings of 7 mm in diameter, which were separated by 13 mm. The strands were smooth and light brown in color. Once formed, the strands were cooled on a conveyer belt and then pelletized.

Example 3

A mixture of 60 wt. % Glucosol™ 800 (Chemstar, Minneapolis, Minn.) and 40 wt. % Pro-Cote® 4200 (DuPont) was initially formed in a Hobart mixer and then added to a K-Tron feeder (K-Tron America, Pitman, N.J.) that fed the materials into a ZSK-30 co-rotating, twin screw extruder (Werner and Pfleidere Corporation, Ramsey, N.J.) as described in Example 1. The first barrel received the mixture at a feed rate of 10 lbs/hr. The temperature profile of zones 1 to 14 of the extruder was 90° C., 110° C., 118° C., 122° C., 122° C., 122° C., and 115° C., The screw speed was set at 150 rpm to achieve a torque of about 60% to 68%. The melt temperature was 124° C. to 127° C. Glycerin was pumped into barrel 5 with a pressurized injector connected with an Eldex pump (Napa, Calif.) at a rate of 24 grams per minute to achieve a 30 wt. % concentration. The vent was opened at the end of the extruder to release moisture. A die was employed to form strands that had 2 openings of 7 mm in diameter, which were separated by 13 mm. The strands were smooth and brown in color. Once formed, the strands were cooled on a conveyer belt and then pelletized.

Example 4

A mixture of 60 wt. % Glucosol™ 800 (Chemstar, Minneapolis, Minn.), 20 wt. % Pro-Cote® 4200 (DuPont), and 20 wt. % wheat gluten (ADM, Decatur, Ill.) was formed in a Hobart mixer. Wheat gluten is composed of the water-insoluble prolamin and glutelin protein fractions known as gliadin and glutenin, respectively. The molecular weight of gliadin is in the range of 20,000 to 50,000 Daltons, while the molecular weight of glutenin is about 250,000 Daltons. The mixture was added to a K-Tron feeder (K-Tron America, Pitman, N.J.) that fed the materials into a ZSK-30 co-rotating, twin screw extruder (Werner and Pfleidere Corporation, Ramsey, N.J.) as described in Example 1. The first barrel received the mixture at a feed rate of 10 lbs/hr. The temperature profile of zones 1 to 14 of the extruder was 90° C., 110° C., 115° C., 118° C., 118° C., 118° C., and 115° C. The screw speed was set at 150 rpm to achieve a torque of about 63% to 67%. The melt temperature was 124° C. to 127° C. Glycerin was pumped into barrel 5 with a pressurized injector connected with an Eldex pump (Napa, Calif.) at a rate of 24 grams per minute to achieve a 30 wt. % concentration. The vent was opened at the end of the extruder to release moisture. A die was employed to form strands that had 2 openings of 7 mm in diameter, which were separated by 13 mm. The strands were smooth and dark brown in color. Once formed, the strands were cooled on a conveyer belt and then pelletized.

Examples 5-7

Mixtures of Glucosol™ 800 (Chemstar, Minneapolis, Minn.) and wheat gluten (Meelunie America, Inc., Farmington, Mich.) was blended in a Hobart mixer according to the ratios indicated below in Table 1. In addition, 2 wt. % Excel P-40S (Kao Corporation, High Point, N.J.) was also added to the mixture. The ingredients were mixed for about 5 minutes. The mixture was then added to K-Tron feeder (K-Tron America, Pitman, N.J.) that fed the materials into a ZSK-30 extruder (Werner and Pfleidere Corporation, Ramsey, N.J.) as described in Example 1. The first barrel received the mixture at 10 lbs/hr and the extruder was heated to a temperature profile as shown in Table 1. Glycerin was pumped into barrel 5 with a pressurized injector connected with an Eldex pump (Napa, Calif.) at a rate of 2.5 pounds per hour to achieve a 20 wt. % concentration. The vent was opened at the end of the extruder to release moisture. A die was employed to form strands that had 2 openings of 7 mm in diameter, which were separated by 13 mm. Once formed, the strands were cooled on a conveyer belt and then pelletized.

TABLE 1

| | | | | | Processing Conditions | | | | | | | | | |
|---|---|---|---|---|---|---|---|---|---|---|---|---|---|---|
| Sample No. | Starch/Gluten Ratio | Mixture Feeding Rate (lb/hr) | Glycerin (lb/hr) | Extruder Speed (rpm) | $T_1$ | $T_2$ | $T_3$ | Extruder Temperature Profile (° C.) $T_4$ | $T_5$ | $T_6$ | $T_7$ | $T_{melt}$ | $P_{melt}$ (psi) | Torque (%) |
| Example 5 | 80/20 | 10 | 2.5 | 150 | 90 | 105 | 120 | 125 | 125 | 124 | 124 | 133 | 110~160 | 45~50 |
| Example 6 | 70/30 | 10 | 2.5 | 150 | 90 | 101 | 120 | 125 | 125 | 120 | 118 | 122 | 100~140 | 35~40 |
| Example 7 | 60/40 | 10 | 2.5 | 150 | 90 | 104 | 123 | 122 | 129 | 115 | 116 | 120 | 120~200 | 35~38 |

Figure 2:
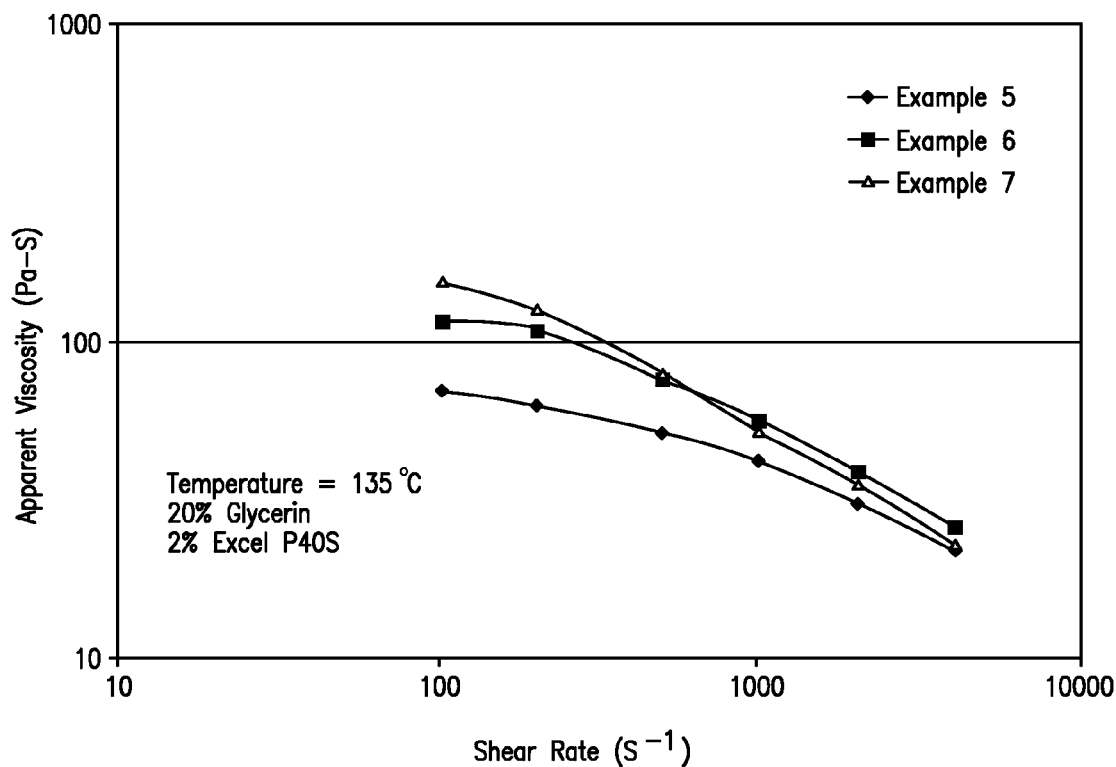
FIG. 2 is a graphical representation of the apparent melt viscosity (Pa·s) of the samples of Examples 5-7 versus shear rate ($s^{-1}$)
Figure 3:
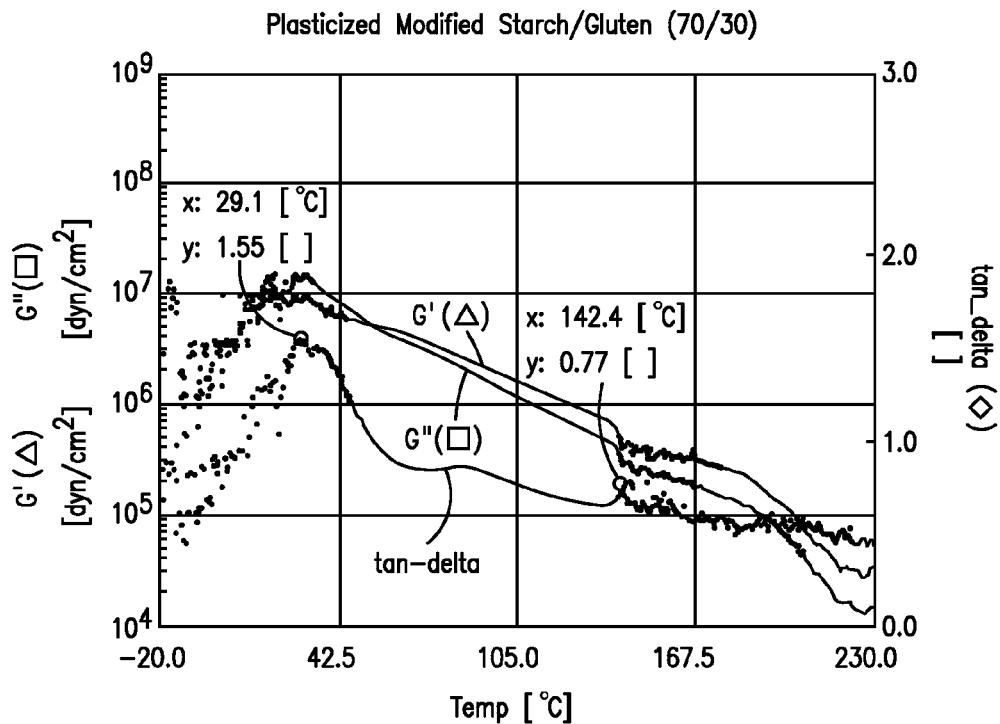
FIG. 3 is a graphical representation of the glass transition temperature and melting temperature for the sample of Example 6.

Samples were tested for their melt rheology behaviors as described above. The results are shown in FIG. 2. As indicated, the apparent viscosity increased (at the same shear rate) as the percentage of gluten protein increased and the percentage of starch decreased. A sample from Example 6 was also tested for its glass transition and melting temperatures using AIRES (Advanced Rheometric Expansion System), manufactured by Rhemetric Scientific (Piscataway, N.J.). The glass transition temperature, $T_g$, storage modulus, G', and loss modulus, G", were determined by peak tan (δ) in the temperature ramp. The measurements were conducted in a dynamic mode. The following test conditions were used: frequency was 6.28 rad/sec, heating rate was 3° C./min, strain of 1%, and test fixture of 8 mm and 25 mm parallel plates. FIG. 3 represents the results from the dynamic mechanical testing. As indicated, $T_g$ for the sample was about 29° C. and the melting temperature was about 142.4° C. The factors affecting the storage modulus, G', may be the molecular weight of base materials, level of mixing during processing of thermoplastic modified starch and gluten.

Example 8

A mixture of 90 wt. % high density polyethylene DMDA-8920 (Dow Chemical of Midland, Mich.) and 10 wt. % of the thermoplastic starch/gluten of Example 6 was added to a K-Tron feeder (K-Tron America, Pitman, N.J.). The DMDA 8920 has a density of 0.954 g/cm$^3$ and a melt flow index of 20 g/10 min., determined according to ASTM D1238 at 190° C. and 2.16 kg. The melting temperature was 130° C. by DSC method. The K-Tron feeder supplied the materials into a ZSK-30 co-rotating, twin screw extruder (Werner and Pfleidere Corporation, Ramsey, N.J.) as described in Example 1. The first barrel received the mixture at a feed rate of 20 lbs/hr. The temperature profile of zones 1 to 14 of the extruder was 90° C., 110° C., 140° C., 145° C., 160° C., 145° C., and 140° C. The screw speed was set at 200 rpm to achieve a torque of about 78% to 83%. The melt temperature was 151° C. The vent was opened at the end of the extruder to release moisture. A three-hole die was used to shape hot melt into three strands that were cooled on a convey belt and pelletized for injection molding.

Example 9

A mixture of 80 wt. % high density polyethylene DMDA 8920 from Dow Chemical (Midland, Mich.) and 20 wt. % of the thermoplastic starch/gluten of Example 6 was added to a K-Tron feeder (K-Tron America, Pitman, N.J.) that fed the materials into a ZSK-30 co-rotating, twin screw extruder (Werner and Pfleidere Corporation, Ramsey, N.J.) as described in Example 1. The first barrel received the mixture at a feed rate of 20 lbs/hr. The temperature profile of zones 1 to 14 of the extruder was 88° C., 110° C., 139° C., 140° C., 160° C., 140° C., and 140° C. The screw speed was set at 200 rpm to achieve a torque of about 75% to 80%. The melt temperature was 147° C. The vent was opened at the end of the extruder to release moisture. A three-hole die was used to shape hot melt into three strands that were cooled on a convey belt and pelletized for injection molding.

Example 10

A mixture of 90 wt. % Pro-fax™ SV954 (Basell North America of Bayport, Tex.) and 10 wt. % of the thermoplastic starch/gluten of Example 6 was added to a K-Tron feeder (K-Tron America, Pitman, N.J.). Pro-fax™ SV954 is a propylene/ethylene copolymer having a density of 0.90 g/cm$^3$ and a melt flow index of 35 g/10 min., determined at 230° C. and 2.16 kg. The K-Tron feeder supplied the materials into a ZSK-30 co-rotating, twin screw extruder (Werner and Pfleidere Corporation, Ramsey, N.J.) as described in Example 1. The first barrel received the mixture at a feed rate of 20 lbs/hr. The temperature profile of zones 1 to 14 of the extruder was 110° C., 130° C., 140° C., 145° C., 145° C., 145° C., and 140° C. The screw speed was set at 200 rpm to achieve a torque of about 62% to 70%. The melt temperature was 154° C. The vent was opened at the end of the extruder to release moisture. A three-hole die was used to shape hot melt into three strands that were cooled on a convey belt and pelletized for injection molding.

Example 11

A mixture of 80 wt. % Pro-Fax™ SV954 and 20 wt. % of the thermoplastic starch/gluten of Example 6 was added to a K-Tron feeder (K-Tron America, Pitman, N.J.) that fed the materials into a ZSK-30 co-rotating, twin screw extruder (Werner and Pfleidere Corporation, Ramsey, N.J.) as described in Example 1. The first barrel received the mixture at a feed rate of 20 lbs/hr. The temperature profile of zones 1 to 14 of the extruder was 105° C., 120° C., 145° C., 148° C., 155° C., 145° C., and 148° C. The screw speed was set at 200 rpm to achieve a torque of about 70% to 100%. The melt temperature was 154° C. The vent was opened at the end of the extruder to release moisture. A three-hole die was used to shape hot melt into three strands that were cooled on a convey belt and pelletized for injection molding.

Examples 12-13

The blends from Examples 8 and 9 were used to make injection molding articles for Example 12 and 13, respectively. A "Boy 22D" injection machine with Dipronic solid state control (Boy Machines, Inc. of Exton, Pa.) was employed to make the mold samples. The clamping force was 24.2 metric tons, the plasticating unit was 24 mm, and the shot size was 1.2 oz (PS). The mold used was an ASTM D638 standard test specimen mold from Master Precision Products, Inc. (Greenville, Mich.). The mold contained a tensile type I specimen, a round disk, a tensile type V specimen, and izod bar, which can be formed at once during single injection operation. The processing temperature profile for heating bands 1 to 3 was 130° C., 135° C., and 135° C., respectively. The nozzle temperature was 140° C., and the mold temperature was set at 26.7° C. The injection molding cycle began when the mold was closed. At this point, the screw moved forward and injected the blend of Example 8 or 9 through the nozzle and into sprue. The material filled the mold (runners, gates, and cavities). During the packing phase, additional material was packed into the cavities while a holding pressure was maintained to compensate for material shrinkage. The material was cooled and solidified in the mold while the screw rotated counterclockwise backward, melting the plastic for the next shot. The mold opened and the parts were ejected with a cycle time of 30 seconds. The next cycle began when the mold closed again. All four components (tensile type I specimen, round disk, tensile type V specimen, and izod bar) were successfully made using the blend from Examples 8 and 9, respectively.

Example 14

The blend from Example 10 was used to make an injection molding article in the manner described above in Examples 12-13. The processing temperature profile for heating bands 1 to 3 was 150° C., 152° C., and 158° C., respectively. The nozzle temperature was 162° C. and the mold temperature was set at 16.7° C. All four components (tensile type I specimen, round disk, tensile type V specimen, and izod bar) were successfully made using the blend from Example 10.

Example 15

The blend from Example 11 was used to make an injection molding article in the manner described above in Examples 12-13. The processing temperature profile for heating bands 1 to 3 was 145° C., 147° C., and 150° C., respectively. The nozzle temperature was 153° C. and the mold temperature was set at 16.7° C. All four components (tensile type I specimen, round disk, tensile type V specimen, and izod bar) were successfully made using the blend from Example 11.

While the invention has been described in detail with respect to the specific embodiments thereof, it will be appreciated that those skilled in the art, upon attaining an understanding of the foregoing, may readily conceive of alterations to, variations of, and equivalents to these embodiments.

Accordingly, the scope of the present invention should be assessed as that of the appended claims and any equivalents thereto.

What is claimed is:

1. An injection molding material comprising from about 5 wt. % to about 50 wt. % of a renewable resin and from about 50 wt. % to about 95 wt. % of a synthetic resin, wherein the renewable resin contains a chemically modified starch component in an amount from about 25 wt. % to about 85 wt. %, wherein the chemically modified starch component comprises a starch ether, a starch ester, or a combination thereof, a plant protein component in an amount from about 5 wt. % to about 50 wt. %, and a plasticizer component in an amount from about 5 wt. % to about 50 wt. %, based on the weight of the renewable resin.

2. The injection molding material of claim 1, wherein the chemically modified starch component includes a hydroxyalkyl starch.

3. The injection molding material of claim 1, wherein the plant protein component includes zein, corn gluten, wheat gluten, canola, sunflower sorghum, soy, a derivative thereof, or a combination thereof.

4. The injection molding material of claim 1, wherein the plant protein component includes gluten or a derivative thereof.

5. The injection molding material of claim 1, wherein the plant protein includes soy or a derivative thereof.

6. The injection molding material of claim 1, wherein the plant protein component contains about 75 wt. % or more of protein.

7. The injection molding material of claim 1, wherein the plasticizer component includes a polyol.

8. The injection molding material of claim 1, wherein the renewable resin is present in the material as a discontinuous phase that is dispersed within a continuous phase of the synthetic resin.

9. The injection molding material of claim 8, wherein the discontinuous phase and the continuous phase each constitute from about 40 vol. % to about 60 vol. % of the material.

10. The injection molding material of claim 1, wherein the chemically modified starch component constitutes from about 30 wt. % to about 80 wt. % of the renewable resin.

11. The injection molding material of claim 1, wherein the plant protein component constitutes from about 10 wt. % to about 40 wt. % of the renewable resin.

12. The injection molding material of claim 1, wherein the plasticizer component constitutes from about 10 wt. % to about 40 wt. % of the renewable resin.

13. The injection molding material of claim 1, wherein the synthetic resin includes a polyolefin, styrenic polymer, polycarbonate, acetal polymer, polyamide, vinyl chloride polymer, polyester, or a combination thereof.

14. The injection molding material of claim 1, wherein the synthetic resin comprises a polyolefin.

15. The injection molding material of claim 14, wherein the polyolefin includes an ethylene polymer, propylene polymer, or a copolymer thereof.

16. The injection molding material of claim 14, wherein the polyolefin has a density of from about 0.93 $g/cm^3$ to about 0.97 $g/cm^3$.

17. The injection molding material of claim 1, wherein the synthetic resin constitutes from about 50 wt % to about 90 wt. % of the molding material.

18. The injection molding material of claim 1, wherein the renewable resin constitutes from about 10 wt. % to about 50 wt. % of the molding material.

19. An injection molded article formed from a material comprising from about 5 wt. % to about 50 wt. % of a renewable resin and from about 50 wt. % to about 95 wt. % of a synthetic resin, wherein the renewable resin contains a chemically modified starch component in an amount from about 25 wt. % to about 85 wt. %, wherein the chemically modified starch component comprises a starch ether, a starch ester, or a combination thereof, a plant protein component in an amount from about 5 wt. % to about 50 wt. %, and a plasticizer component in an amount from about 5 wt. % to about 50 wt. %, based on the weight of the renewable resin.

20. The article of claim 19, wherein the article is a container for wet wipes.

21. The article of claim 20, wherein the article has a flexural modulus of about 500 Newtons per square millimeter or greater.

22. A method for forming a molded article, the method comprising:
  injecting a molding material into a cavity defined between bases of a molding apparatus, wherein the molding material comprises from about 5 wt. % to about 50 wt. % of a renewable resin and from about 50 wt. % to about 95 wt. % of a synthetic resin, wherein the renewable resin contains a chemically modified starch component in an amount from about 25 wt. % to about 85 wt. %, wherein the chemically modified starch component comprises a starch ether, a starch ester, or a combination thereof, a plant protein component in an amount from about 5 wt. % to about 50 wt. %, and a plasticizer component in an amount from about 5 wt. % to about 50 wt. %, based on the weight of the renewable resin;
  cooling the molding material within the cavity to form an article; and
  removing the article from the cavity.

* * * * *